United States Patent
Molho et al.

(10) Patent No.: US 6,898,808 B2
(45) Date of Patent: May 31, 2005

(54) DUAL FLUSHING MECHANISM

(75) Inventors: Josef Molho, High River (CA); Branislav Kragulj, Calgary (CA)

(73) Assignee: Aquanotion Ltd., High River (CA)

( * ) Notice: Subject to any disclaimer, the term of this patent is extended or adjusted under 35 U.S.C. 154(b) by 0 days.

(21) Appl. No.: 10/463,417

(22) Filed: Jun. 18, 2003

(65) Prior Publication Data
US 2004/0255372 A1 Dec. 23, 2004

(51) Int. Cl.$^7$ ................................................. E03D 1/14
(52) U.S. Cl. ............................................................ 4/325
(58) Field of Search ............................ 4/324–327, 378, 4/392–394, 405, 415

(56) References Cited

U.S. PATENT DOCUMENTS

| | | |
|---|---|---|
| 3,988,786 A | 11/1976 | Lehfeldt |
| 4,128,906 A | 12/1978 | Raz |
| 4,141,092 A | 2/1979 | Jones |
| 4,175,296 A | 11/1979 | Goldman |
| 4,225,987 A | 10/1980 | Goldman et al. |
| 4,305,163 A | 12/1981 | Raz |
| 4,406,024 A | 9/1983 | Chiu et al. |
| 4,411,029 A | 10/1983 | Huang |
| 4,530,119 A | 7/1985 | Chiu et al. |
| 4,624,018 A | 11/1986 | Kurtz |
| 4,750,220 A | 6/1988 | Baumann |
| 4,791,689 A | 12/1988 | Garcia De Couto |
| 4,817,216 A | 4/1989 | Auman |
| 4,837,867 A | 6/1989 | Miller |
| 4,937,894 A | 7/1990 | Hill, Jr. et al. |
| 4,996,726 A | 3/1991 | Schrock et al. |
| 5,070,547 A | 12/1991 | Comparetti |
| 5,243,713 A | 9/1993 | More |
| 5,261,129 A | 11/1993 | Roy |
| 5,301,373 A | 4/1994 | Hull et al. |
| 5,396,665 A | 3/1995 | Raz et al. |
| 5,400,445 A | 3/1995 | Hull |
| 5,459,885 A | 10/1995 | Gaw |
| 5,500,961 A | 3/1996 | Tsai |
| 5,519,898 A | 5/1996 | Guo et al. |
| 5,524,297 A | 6/1996 | Harrison |
| 5,555,573 A | 9/1996 | Jensen |
| 5,594,959 A * | 1/1997 | Nichols-Roy et al. ......... 4/415 |
| 5,711,039 A | 1/1998 | Mizrahi |
| 5,713,086 A | 2/1998 | Diethelm |
| 5,794,278 A | 8/1998 | Kirt |
| 5,806,108 A | 9/1998 | Mizrahi |
| 5,896,593 A | 4/1999 | Mizrahi |
| 6,421,844 B1 | 7/2002 | Scott |
| 6,467,100 B2 | 10/2002 | Leach |
| 6,493,449 B2 | 12/2002 | Anshel et al. |

FOREIGN PATENT DOCUMENTS

CA 2432146 12/2001

OTHER PUBLICATIONS

Kohler Service Parts, Toilet Trip Levers (6 pages).

* cited by examiner

Primary Examiner—Tuan Nguyen
(74) Attorney, Agent, or Firm—Gowling Lafleur Henderson LLP; Robert M. Hendry

(57) ABSTRACT

A double trip handle type flush control assembly is disclosed, which operates to allow either a full volume of water to be drawn out of the toilet tank or a partial volume of water to be drawn out of the tank. In particular, the double trip handle type flush control assembly of the present invention is adaptable for use in any size toilet tank. Further, the flush control assembly of the present invention has been adapted to accommodate a refill tube, which directs water from a ball cock valve into an overflow tube to refill the toilet trapway after flushing.

1 Claim, 4 Drawing Sheets

DUAL FLUSHING MECHANISM

FIELD OF THE INVENTION

The present invention relates generally to a toilet flushing mechanism that allows a user to chose between a partial flush and a full flush. In particular, the present invention relates to a dual flushing assembly having two concentric handles operable to either partially or fully flush a toilet.

BACKGROUND OF THE INVENTION

Water conservation is becoming increasing more important. A significant source of water consumption is the water used in flushing toilets. As is well known in the art, several problems and difficulties are encountered in providing suitable means for flushing controlled amounts of water from a toilet water tank.

One of the most common flushing apparatuses in use today utilizes a ball cock supply valve that controls the inlet of water into the toilet tank. A buoyant float ball is connected to the ball cock by means of a trip lever and as the toilet tank is filled with water, the buoyant ball rises. The upward motion of the buoyant ball is transmitted to the ball cock supply valve through the trip lever until, at a predetermined water level, the ball cock shuts off the water inlet to the toilet tank. In most toilets, the water level in the tank may be adjusted by means of a screw-set mechanism located in the ball cock supply valve. Once the water level in the tank is set, further adjustment is not required and a consistent volume of water will be discharged each time the toilet is flushed.

In addition to the ball cock supply valve, a second valve means is needed for controlling the flushing of the toilet, namely a flush valve. Typically the flush valve comprises a flapper that seals water into the toilet tank. When the trip lever or handle on the outside of the toilet tank is depressed to initiates the flush of the toilet, the trip lever activities a trip arm to lift the flapper and allow water to exit the tank into the toilet bowl for the flush cycle.

Finally, a tank refill tube is commonly integrated with the water supply valve and the flush valve to ensure that the toilet trapway refills with water after the flush is completed.

A flush valve mechanism for controlling the flushing action of water through the water outlet of a toilet tank is taught in U.S. Pat. No. 4,305,163. The valve taught in U.S. Pat. No. 4,305,163 is a dual activity flush valve having a float assist, the operation of which permits the complete drainage of the water in the tank for a full flush. The flush valve operates by means of a pair of lever arms whereby one arm operates to lift up a vertical tube for limited flushing and the other arm operates to lift both the vertical tube and an ancillary float assist that extends the opening time of the valve until the entire water volume is depleted. Such a valve system is manufactured by Plasson Maagan Michael Industries Ltd. ("Plasson").

The present invention provides a dual flushing assembly comprising dual handles for use with currently available components such as conventional ball cock supply valves and flushing valves as taught in U.S. Pat. No. 4,305,163 and manufactured by Plasson. Thus, when one wishes to flush only liquid waste, one of the dual handles will be responsible for a partial flush and when one wishes to flush both solid and liquid waste, a second handle will operate to effect a full flush.

SUMMARY OF THE INVENTION

The present invention has been accomplished to provide a double trip handle type flush control assembly, which operates to allow either a full volume of water to be drawn out of the toilet tank or a partial volume of water to be drawn out of the tank. In particular, the double trip handle type flush control assembly of the present invention is adaptable for use in any size toilet tank. Further, the flush control assembly of the present invention has been adapted to accommodate a refill tube, which directs water from the ball cock valve into an overflow tube to refill the toilet trapway after flushing.

The present invention provides a dual flushing apparatus, mountable through an aperture in a wall of a toilet tank, for use with a dual flushing valve assembly comprising a vertical tube having a first float means attached thereto and a float assist arm having a second float attached thereto, said flushing apparatus comprising:

a rotatable first handle means comprising a first handle and a first shaft having an annulus therethrough;

a rotatable second handle means comprising a second handle and a second shaft, said second shaft adapted to be slideably received in said annulus of said first shaft such that the second handle nests with the first handle;

a first flush lever arm have two ends, a first end operably attached to said first shaft and a second end operably attached to said float assist arm; and a second flush lever arm having two ends, a first end operably attached to said second shaft and a second end operably attached to said vertical tube, said second end further having a bore therethrough and a nipple member in communication with said bore for attaching a refill tube such that when said second flush lever arm is operably attached to said vertical tube, said bore is directly over said vertical tube;

whereby said first flush lever arm supports said second flush lever arm such that when said second handle is depressed only said vertical tube is lifted for a partial flush but when said first handle is depressed both said vertical tube and said assist arm are lifted for a full flush.

In a preferred embodiment, the first flush lever and the second flush lever arm are adjustable in length so as to fit in any size toilet tank.

In another preferred embodiment, the first flush lever arm further comprises a first arm portion and a second arm portion, whereby each arm portions have male ends, and the second flush lever arm further comprises a first arm portion and a second arm portion, each arm portions having male ends. The male ends of the first and second arm portions of the first flush lever arm are interconnected by means of a first tube. The male ends of the first and second arm portions of said second flush lever arm are also interconnected by means of a second tube. The first and second tubes can be made in a variety of lengths, or can be of one length that can be cut to adapt to a particular size toilet tank.

In another preferred embodiment, the present invention provides a dual flushing apparatus comprising:

a rotatable first handle means comprising a first handle and a first shaft having an annulus therethrough;

a rotatable second handle means comprising a second handle and a second shaft, said second shaft adapted to be slideably received in said annulus of said first shaft such that the second handle nests with the first handle;

means for securing said second handle means to said first handle means;

a first flush lever arm operably attached to said first shaft, said first flush lever arm having a first arm portion and a second arm portion and each arm portion having an annulus therethrough;

a second flush lever arm operably attached to said second shaft, said second flush lever arm having a first arm portion and a second arm portion, each arm portion having an annulus therethrough;

a first rod member for insertion into said annulus of said first and second arm portions of said first flush lever arm to interconnect said first and second arm portions; and a second rod member for insertion into said annulus of said first and second arm portions of said second flush lever arm to interconnect said first and second arm portions.

DETAILED DESCRIPTION OF THE INVENTION

Figure 1:
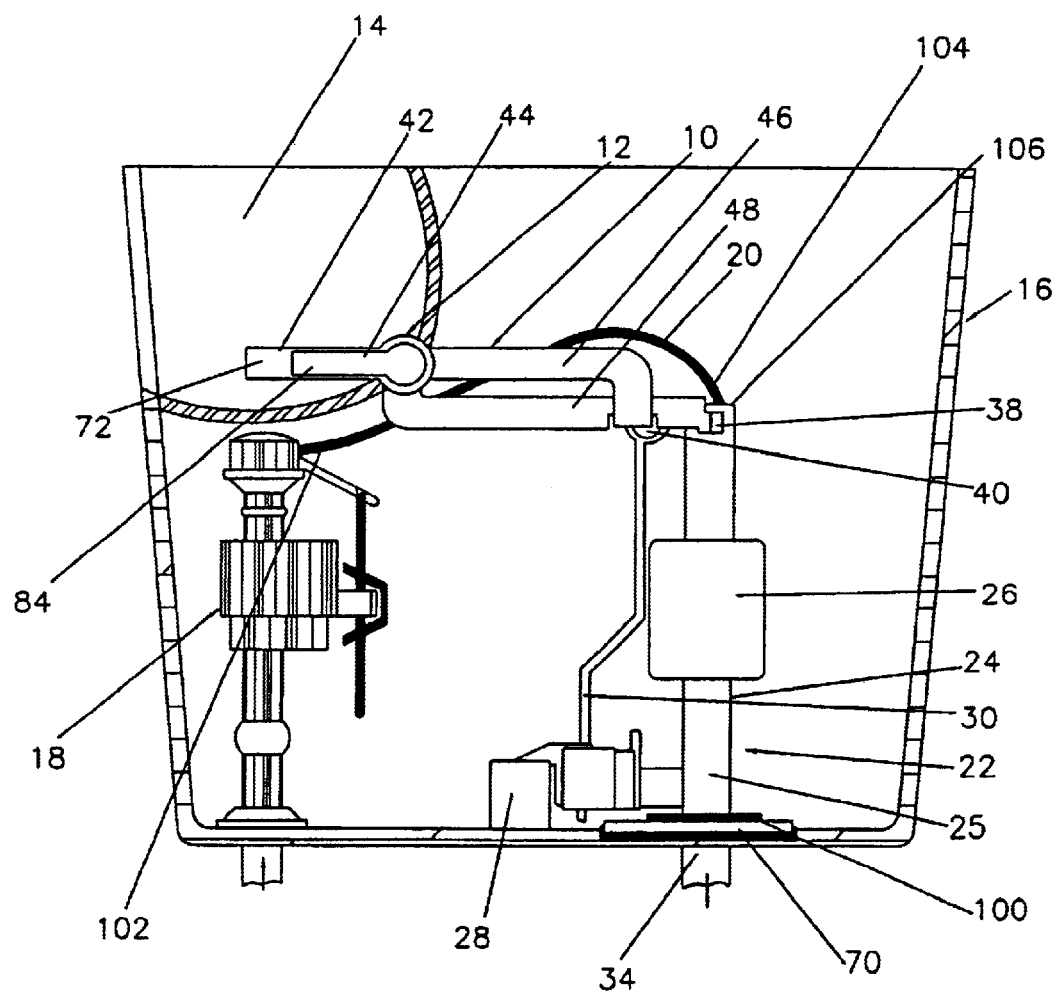
FIG. 1 shows the dual flushing apparatus of the present invention installed in a toilet tank.

In FIG. 1, an embodiment of the dual flushing assembly 10 of the present invention has been installed through a mounting hole 12 in a wall 14 of a toilet tank 16. In addition to the dual flushing assembly 10, the toilet tank 16 comprises a ball cock valve assembly 18, a dual acting flush valve assembly 22 and a refill tube 20, wherein one end of refill tube 20 is attached to ball cock valve assembly 18 and the other end is attached to flush valve assembly 22. The dual acting flush valve assembly 22 is preferably constructed of a thermoplastic material and manufactured by Plasson.

Dual acting flush valve assembly 22 is used in place of conventional flush valves such as a flapper valve or ball type valve because it has been designed to either partially or fully release water from the tank into the toilet bowl, as the need arises. Dual acting flush valve assembly 22 comprises a water outlet valve 24 and a buoyant valve engaging assembly which assembly comprises a float assist 28 attached to one end of a float assist arm 30. Float assist arm 30 further comprises a ring 40 attached to the opposite end from float assist 28. Float assist arm 30 operates to release float assist 28.

Water outlet valve 24 comprises vertical tube 25 having a toilet mounting means 70 at one end for mounting said dual flush valve assembly 22 to water outlet 34. Vertical tube 25 further comprises a flushing valve seal 100, which seals the water outlet valve when water outlet valve is not in the lifted position. When vertical tube 25 of the water outlet valve 24 is lifted, flushing valve seal 100 is also lifted thereby releasing water through water outlet 34 into the toilet bowl (not shown).

Vertical tube 25 further comprises an aperture 38 at the opposite end and a partial float 26. In operation, dual acting flush valve assembly 22 releases a full tank of water when both the float assist arm 30 and vertical tube 25 are simultaneously lifted. However, when vertical tube 25 is lifted alone, only a partial amount of water is released from the tank. Dual acting flush valve assembly 22 is described in more detail in U.S. Pat. No. 4,305,163, incorporated herein by reference.

To ensure that the toilet trapway is refilled after flushing, refill tube 20, having first end 102 and second end 104 is provided. First end 102 is connected to ball cock valve assembly 18, which supplies water to refill tube 20. Second end 104 of refill tube 20 is posited directly over flush valve assembly 22 for supplying water through vertical tube 25 and water outlet 34.

Figures 2A, 2B:
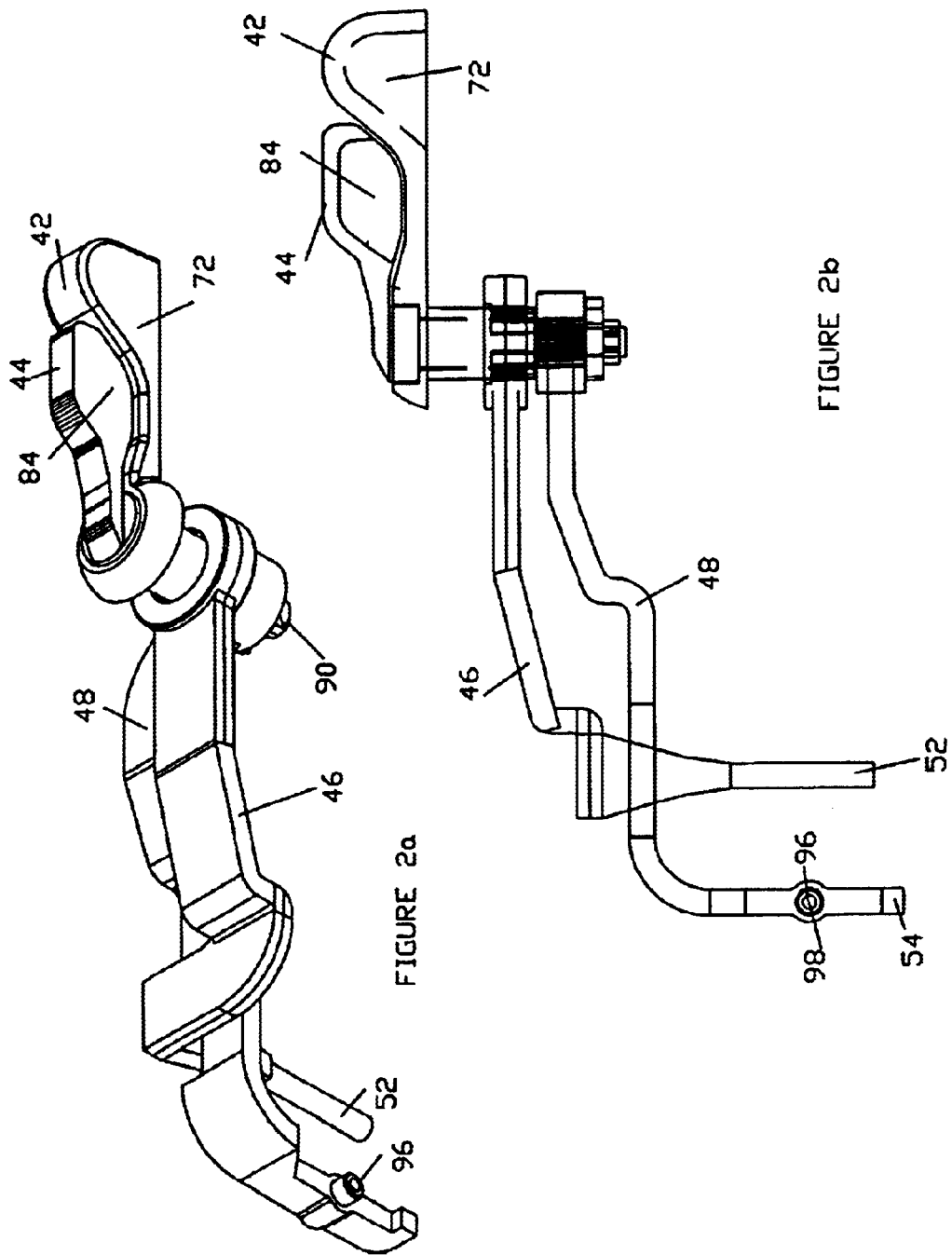
FIG. 2a is a perspective view of the dual flushing apparatus of the present invention.
FIG. 2b is a side view of the dual flushing apparatus of the present invention.
Figure 3:
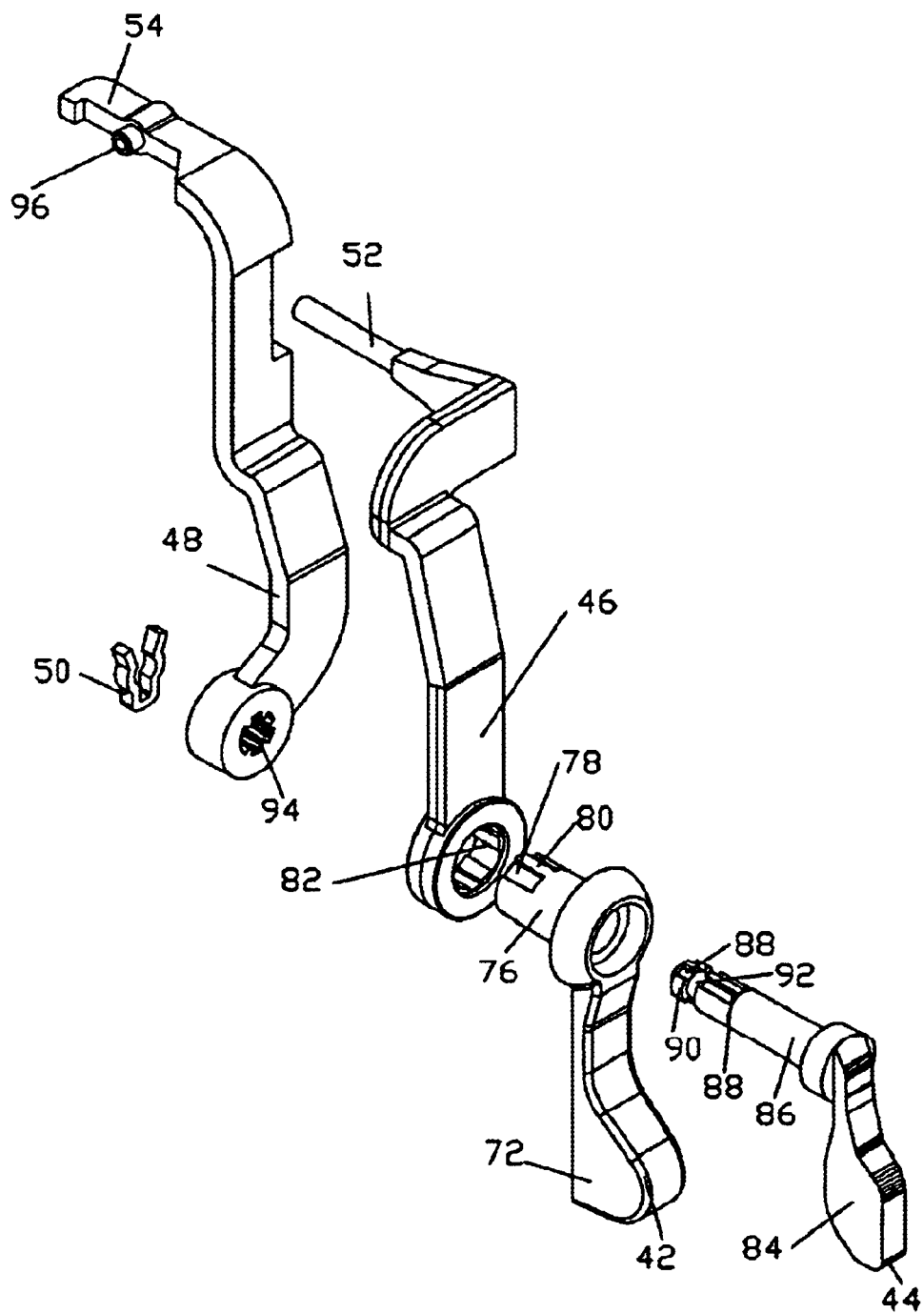
FIG. 3 shows a perspective of the individual parts of the dual flushing apparatus and how they fit together.

Dual flushing assembly 10 of the present invention has been adapted to be used with such dual acting flushing valve assemblies as shown in FIG. 1. One embodiment of dual flushing assembly 10 is illustrated in FIGS. 2a and 2b. FIG. 3 provides details of the interconnection of the various components of dual flushing assembly 10. A rotatable first handle means 42 is provided, said first handle means 42 comprising a handle 72 ("first handle") having a hollow shaft 76 ("first shaft") at one end. End 78 of shaft 76 comprises a plurality of splines 80 arranged for mating with the correspondingly shaped hub 82 of first flush lever arm 46. This ensures proper orientation of said first lever arm 46 relative to first handle means 42.

A rotatable second handle means 44, having a handle 84 ("second handle") and a shaft 86 ("second shaft"), said shaft 86 located at one end of said handle 84, is shown in FIGS. 2a and 2b with second shaft being inserted into first shaft such that second shaft is free to rotate concentrically within first shaft. Thus, second handle is resting on first handle to give the appearance of a single handle.

Shaft 86 further comprises a plurality of splines 88 at end 90 of shaft 86, said splines 88 being discontinuous across the length of end 90 because of depressed ridge 92, said ridge 92 being continuous around the circumference of shaft 86. Splines 88 are arranged for mating with the correspondingly shaped hub 94 of second flush lever arm 48.

FIGS. 2a and 2b show second handle means 44 nested within first handle means 42. Retainer means 50 fittingly attaches to ridge 92 and is designed to ensure that first and second handle means remain nested. Retainer means 50 is shown in FIG. 3 as a simple clip, which clips over ridge 92.

First flush lever arm 46 further comprises end 52 adapted to be mounted into ring 40 of float assist arm 30 as shown in FIG. 1. First flush lever arm 46 is bent such that it is positioned beneath second flush lever arm 48. Second flush lever arm 48 further comprises end 54 adapted to penetrate aperture 38 of vertical tube 25 of water outlet valve 24 as shown in FIG. 1.

Second flush lever arm 48 further comprises a bore 98 therethrough and nipple 96, said nipple adapted to snugly receive refill tube 20 as shown in FIG. 1. As previously mentioned, first end 102 of refill tube 20 is connected to ball cock valve assembly 18 and second end 104 of refill tube 20 is posited directly over the vertical tube 25 of dual acting flush valve assembly 22 for supplying water through vertical tube 25 and water outlet 34. In the prior art, the refill tube had an elbow tube connected at its end, and said elbow tube simply hooked to the lip of the vertical tube of a dual acting flush valve assembly. However, such an attachment means of the refill tube to the vertical tube proved to be unsatisfactory as the refill tube was constantly being "knocked off" the lip of the vertical tube. As well, the movement of the vertical tube of the dual flush valve assembly, in response to the movement of the second flush lever arm is partially restricted due to the pull or drag of the elbow tube on the refill tube.

In the present invention, second end 104 of refill tube 20 snugly attaches on to nipple 96 located at end 54 of second flush lever arm 48 such when end 54 penetrates aperture 38 of vertical tube 25, bore 98 and nipple 96 are located directly over the opening 106 of vertical tube 25. Once bore 98 and nipple 96 are positioned directly over opening 106, refill tube 20 can be fitted thereon to supply water through vertical tube 25 and through water outlet 34 in order to refill the toilet trapway (not shown) once flushing has occurred. Thus, by snugly fitting the refill tube 20 on second flush lever arm 48, refill tube 20 will be less likely to be knocked off, and will always be positioned directly above the vertical tube. Further, by being positioned on the second flush lever arm 48, there is no drag or pull on vertical tube 25.

In a preferred embodiment first and second flush lever arms 46 and 48 are adjustable in length. Such adjustability is desirable due to the variety of different tank sizes and shapes on the market today. Adjustability is achieved in a preferred embodiment as follows.

Figure 4A:
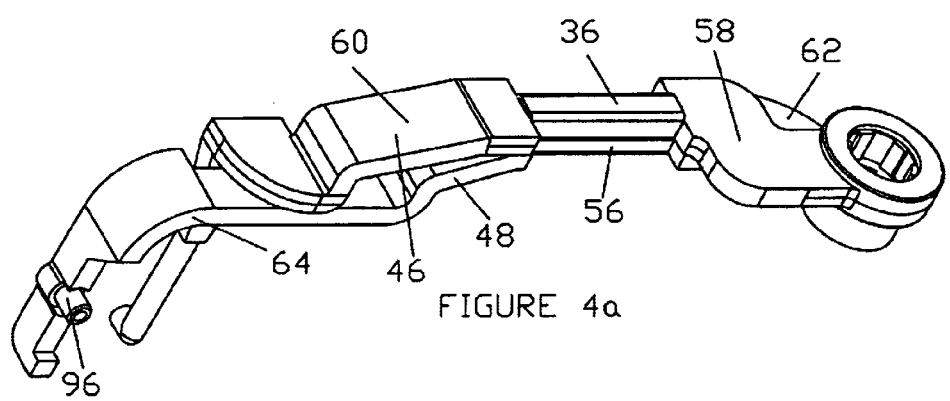
FIG. 4a is a perspective view of the dual flushing apparatus of the present invention showing the adjustable flush lever arms.
Figure 4B:
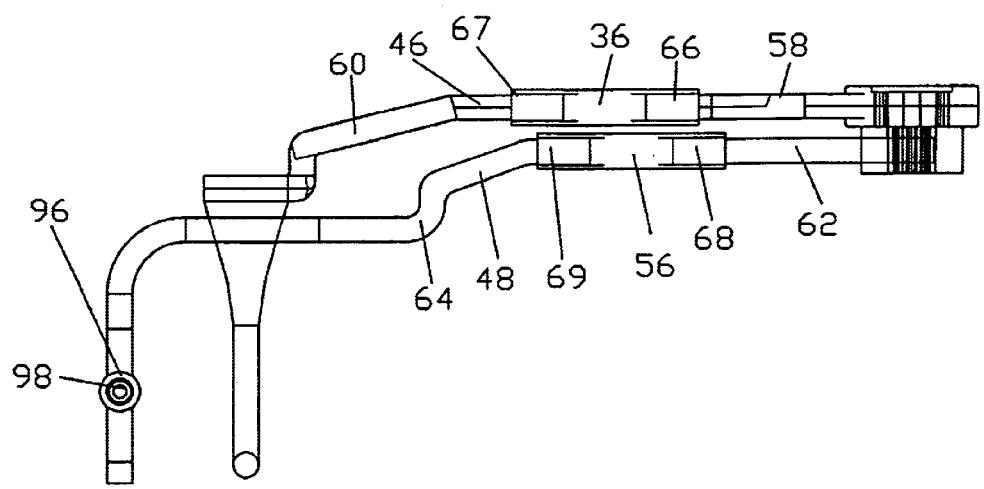
FIG. 4b is a side view of the dual flushing apparatus of the present invention showing the adjustable flush lever arms.

With reference now to FIGS. 4a and 4b, first flush lever arm 46 is comprised of two separate sections 58 and 60, each having male ends 66 and 67, respectively. Tube 36, which can be made in any length, or, in the alternative, can be cut to any length, snugly fits over male ends 66, 67 of sections 58 and 60, thereby connecting the two sections 58 and 60 to form a contiguous arm. Similarly, second flush lever arm 48 is comprised of two separate sections 62 and 64, each having male ends 68 and 69, respectively. Tube 56, which again can be made in any length or cut to any length, snugly fits over male ends 68, 69 of sections 62 and 64 to form a contiguous arm.

In an alternative embodiment (not shown), each arm section could have an annulus partially therethrough and a dowel could be inserted into each annulus to form a contiguous arm.

With reference again to FIG. 1, the dual flushing assembly of the present invention operates as follows. When the handle 84 of second handle means 44 is depressed, second flush lever arm 48 is lifted, which in turn lifts vertical tube 25 of water outlet valve 24 and flushing valve seal 100 thereby releasing water through water outlet 34 into toilet bowl (not shown). However, partial float 26 is positioned on vertical tube 25 such that the water outlet valve 24 will close water outlet 34 when only part of the water in the tank 14 is released. This results in only a partial flush. In a preferred embodiment, partial float 26 can be adjustable along the length of vertical tube 25 to control the amount of water released during partial flushing.

When handle 72 of first handle means 42 is depressed, first flush lever arm 46 is lifted, which in turn lifts both second flush lever arm 48 and float assist arm 30. Second flush lever arm 48 in turn lifts vertical tube 25 as described above. Float assist arm 30 in turn releases float assist 28. When float assist 28 is released, it operates to keep the vertical tube 25 in the lifted position for a longer period of time. Hence, water outlet valve 24 will remain in the lifted position longer thereby allowing all of the water in the tank 14 to be released through water outlet 34 into toilet bowl (not shown). This results in a full flush.

While various embodiments in accordance with the present invention have been shown and described, it is understood that the same is not limited thereto, but is susceptible to numerous changes and modifications as known to those skilled in the art, and therefore the present invention is not to be limited to the details shown and described herein, but is intended to cover all such changes and modifications as are encompassed by the scope of the appended claims.

What is claimed is:

1. A dual flushing apparatus, mountable through an aperture in a wall of a toilet tank, for use with a dual flushing valve assembly comprising a vertical tube having a first float means attached thereto and a float assist arm having a second float attached thereto, said flushing apparatus comprising:

(a) a rotatable first handle means comprising a first handle and a first shaft having an annulus therethrough;

(b) a rotatable second handle means comprising a second handle and a second shaft, said second shaft adapted to be slideably received in said annulus of said first shaft such that the second handle nests with the first handle;

(c) means for securing said second handle means to said first handle means;

(d) a first flush lever arm having a first arm portion operably attached to said first shaft and a second arm portion attachable to said float assist arm;

(e) a second flush lever arm having a first arm portion operably attached to said second shaft and a second arm portion attachable to said vertical tube; and (f) adjustment means on at least one of the first and second flush lever arms for adjusting said first arm portion relative to respective said second arm portion;

whereby said first flush lever arm supports said second flush lever arm such that when said second handle is depressed only said vertical tube is lifted for a partial flush but when said first handle is depressed both said vertical tube and said assist arm are lifted for a full flush;

wherein said second arm portion further has a bore therethrough and a nipple member in communication with said bore for attaching a refill tube such that when said second flush lever arm is operably attached to said vertical tube, said bore is directly over said vertical tube.

* * * * *